United States Patent [19]
Allard et al.

[11] Patent Number: 5,239,147
[45] Date of Patent: Aug. 24, 1993

[54] FLOATING, SERVICEABLE HORN SWITCH, AIR BAG MODULES

[75] Inventors: John E. Allard, North Ogden; Davin G. Saderholm, Salt Lake City; Bradley W. Smith, Ogden, all of Utah

[73] Assignee: Morton International, Inc., Chicago, Ill.

[21] Appl. No.: 923,430

[22] Filed: Aug. 3, 1992

[51] Int. Cl.⁵ ............................................. H01H 9/00
[52] U.S. Cl. .................................. 200/61.54; 200/61.55
[58] Field of Search ....................... 200/61.54–61.57; 280/728–735

[56] References Cited

U.S. PATENT DOCUMENTS

| | | | |
|---|---|---|---|
| 3,819,205 | 6/1974 | Dunford et al. | |
| 4,325,568 | 4/1982 | Clark et al. | 280/731 |
| 4,785,144 | 11/1988 | Fosnaugh et al. | 200/61.55 |
| 4,808,776 | 2/1989 | Niwa et al. | 200/61.55 |
| 4,938,503 | 7/1990 | Muraoka et al. | 280/731 |
| 4,963,704 | 10/1990 | Buma et al. | 200/61.55 |
| 5,023,412 | 6/1991 | Ishida | 200/61.54 |

Primary Examiner—J. R. Scott
Attorney, Agent, or Firm—Gerald K. White

[57] ABSTRACT

A floating, serviceable, horn blowing switch consists of a shoulder bolt and stud which in conjunction with an assembly retainer and lock nut hold an air bag module assembly to the steering wheel of an automotive vehicle. The horn switch assembly includes a pre-stressed compression spring and two concentric housings that are arranged to snap together. The housings act as an electrical insulator and house the compression spring and electrical contacts. Lead wires connect the electrical contacts to a power source and the horn mechanism. The electrical contact gap is governed by the vibration requirements of the vehicle and stiffness of the compression spring.

10 Claims, 3 Drawing Sheets

FLOATING, SERVICEABLE HORN SWITCH, AIR BAG MODULES

BACKGROUND OF THE INVENTION

1. Field of the Invention

This invention relates to an improvement in horn blowing switch arrangements for automotive vehicle steering wheels that are provided with an inflatable air bag occupant restraint module, and more particularly to a floating, serviceable center blow horn switch assembly for use with such air bag module.

2. Description of the Prior Art

Horn switches, typically, are easier to operate when mounted in the center of a steering wheel. That location has not been utilized for horn switch assemblies, however, in order to avoid the risk of injury to the driver and passengers when the air bag is deployed. Consequently, horn switch assemblies have been mounted to one side of the air bag module. Upon deployment of the air bag, the horn switch assembly is maintained in place, thus avoiding risk of injury to occupants of the vehicle. A disadvantage of such horn switch assemblies is that they are more difficult to access for blowing the horn compared to a conventional horn pad positioned above the hub in the center of the steering wheel.

U.S. Pat. Nos. 3,819,205 to Dunsford et al. and 4,325,568 to Clark et al. each disclose an inflatable air bag occupant restraint module on the steering wheel of an automotive vehicle together with a horn blowing switch arrangement. In each case the horn blowing switch arrangement is mounted on the module in a position adjacent the rim of the steering wheel and is manually depressible for blowing the horn.

U.S. Pat. No. 4,785,144 to Fosnaugh et al. discloses an inflatable air bag occupant restraint module on a vehicle steering wheel together with a floating horn blowing switch module that is spring mounted between the air bag module and the hub of the steering wheel. The switch module for blowing the horn is actuated when the module is manually depressed. If, after assembly on the steering wheel, access to the switch module is desired, the air bag module must be disassembled from the switch module.

There is a need in the automotive industry for a serviceable center blow horn switch assembly for use with an air bag module. Current commercial availability includes a floating horn switch arrangement, similar to that disclosed in the Fosnaugh et al. patent, which floats on four stud or mounting locations. These switches are integral with the air bag module assembly Thus, the module must be disassembled and replaced to service the switch. Disassembly of the air bag module is not a viable option because of the liability related to an air bag occupant restraint system. Replacement is a costly proposition.

Thus, there is a need and a demand for a floating center blow horn switch assembly for use with air bag modules that are provided on vehicle steering wheels, which switch assembly is serviceable without disassembling or replacing the air bag module. The present invention was devised to satisfy such need and demand.

SUMMARY OF THE INVENTION

An object of the invention is to provide an improved center blow horn blowing switch assembly for use with an air bag module mounted on the steering wheel of an automotive vehicle that is characterized in allowing the switch assembly to be serviced without disassembling or replacing the module.

Another object of the invention is to provide in combination with a vehicle steering wheel having an armature portion and a rim portion and an inflatable restraint module assembly including a housing plate having first and second pairs of spaced apertures therein aligned with corresponding apertures in the armature with an attachment stud fixedly attached to the housing plate individual to and extending outwardly through and from each of the apertures therein and through the corresponding aperture in the armature for holding the module assembly to the armature, a separate horn blowing switch assembly individually associated with each of two at least of the attachment studs, each such horn blowing switch assembly being operative normally to hold the module assembly in a predetermined spaced relation to the armature, and comprising:

a pre-stressed compression spring, first and second cylindrical housings each of which have a flange disposed on one end thereof, which housings snap together with the stud and compression spring in concentric relation therewith and with the flanges thereof positioned in a predetermined spaced relation, a first electric contact positioned on the flange of the first one of the cylindrical housings, a second electric contact positioned on the flange of the second one of the cylindrical housings with the second electric contact disposed in opposing relation to the first electric contact, with the first and second cylindrical housings being made of electrically non-conductive material and acting as an electrical insulator and housing the spring and electric contacts, with the compression spring holding the first and second housings in a predetermined positional relationship in which the electric contacts are held separated from each other by a predetermined gap, whereby pressing on the module to cause relative movement between the first and second cylindrical housings against the force of the compression spring causes the electric contacts to be brought into engagement with each other for closing an electric circuit from a power source to a horn mechanism in the vehicle.

A further object of the invention is to provide an improved horn blowing switch assembly wherein the top of the air bag module is fixed with existing, that is, conventional, attachment means to two upper studs of the armature of the steering wheel whereby the gap on the upper show surface of the module is held to tight tolerances with the electrical contact gap at two bottom studs on the armature of the steering wheel being held to a minimum in order to reduce the bottom module show surface gap.

In accomplishing these and other objectives of the invention, a horn switch assembly is provided including a shoulder bolt and stud which in conjunction with an assembly retainer and lock nut hold the air bag module assembly to the steering wheel. The horn switch assembly consists of a pre-stressed compression spring and two concentric housings that snap together. The housings act as an electrical insulator and house the spring and electrical contacts. Suitably insulated lead wires are provided for connection of the electrical contacts to a power source and the horn mechanism. The distance between the contacts, that is, the electrical contact gap, is determined by the vibration requirements of the automotive vehicle and stiffness of the compression spring.

The various features of novelty which characterize the invention are pointed out with particularity in the claims annexed to and forming a part of the specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying figures of drawings which form part of the specification, in which like parts are designated by the same reference numbers, and of which.

DESCRIPTION OF THE PREFERRED EMBODIMENT

Figure 1:
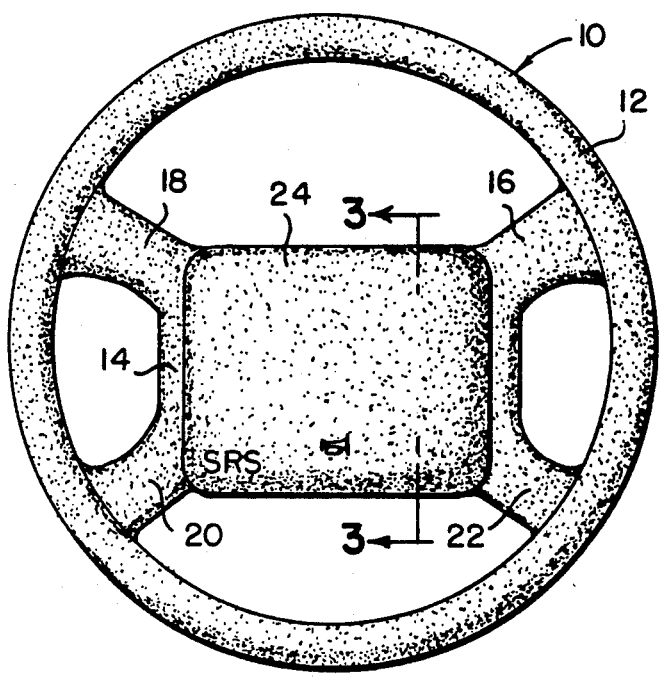
FIG. 1 is a top view of an embodiment of the invention mounted to the steering wheel of an automotive vehicle.

FIG. 1 illustrates an automotive vehicle steering wheel assembly 10 having a rim 12 and including an armature 14 (which is referred to hereinafter as a second support means) with four spokes, designated, respectively, 16, 18, 20 and 22, projecting therefrom to the rim 12. An air bag module 24 and a horn blowing switch assembly 26 for use therewith (not shown in FIG. 1) are mounted on the steering wheel assembly in a manner illustrated in FIGS. 2-5.

Figure 3:
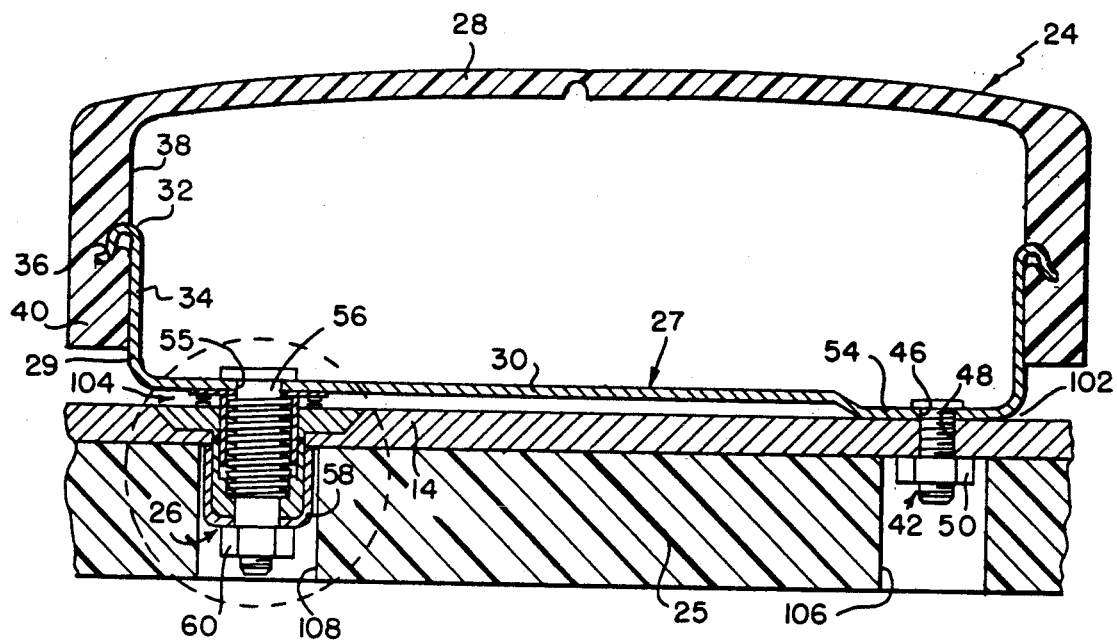
FIG. 3 is a cross sectional view taken along the lines 3—3 of FIG. 1 and illustrates the horn blowing switch arrangement according to the invention.

In FIG. 3, a view taken along the lines 3—3 of FIG. 1, there is illustrated a cross-sectional view of the air bag module 24 and the horn blowing switch assembly 26. A steering wheel shroud 25 is provided in association with the armature 14. The air bag module 24 is housed in a container 27 including a cover 28 having a generally rectangular box-like shape and a supporting housing member 29 having a plate portion 30 which is disposed in press fit relation with cover 28 and on which are mounted an inflator and a folded air bag (both of which are not shown). The plate portion 30 of the supporting housing member 29 is referred to hereinafter as a first support means The inflator and air bag per se form no part of the present invention and have not been shown to avoid undue complication of the drawing The plate portion 30 is generally rectangular and deep dish-like in shape. An extreme upper edge 32 of the upstanding side wall 34 of the plate 30 is curled outwardly, as shown, for engaging and being captured or locked in a groove 36 that is provided on the inner surface 38 of depending wall 40 of cover 28, when pressed in place.

Figure 2:
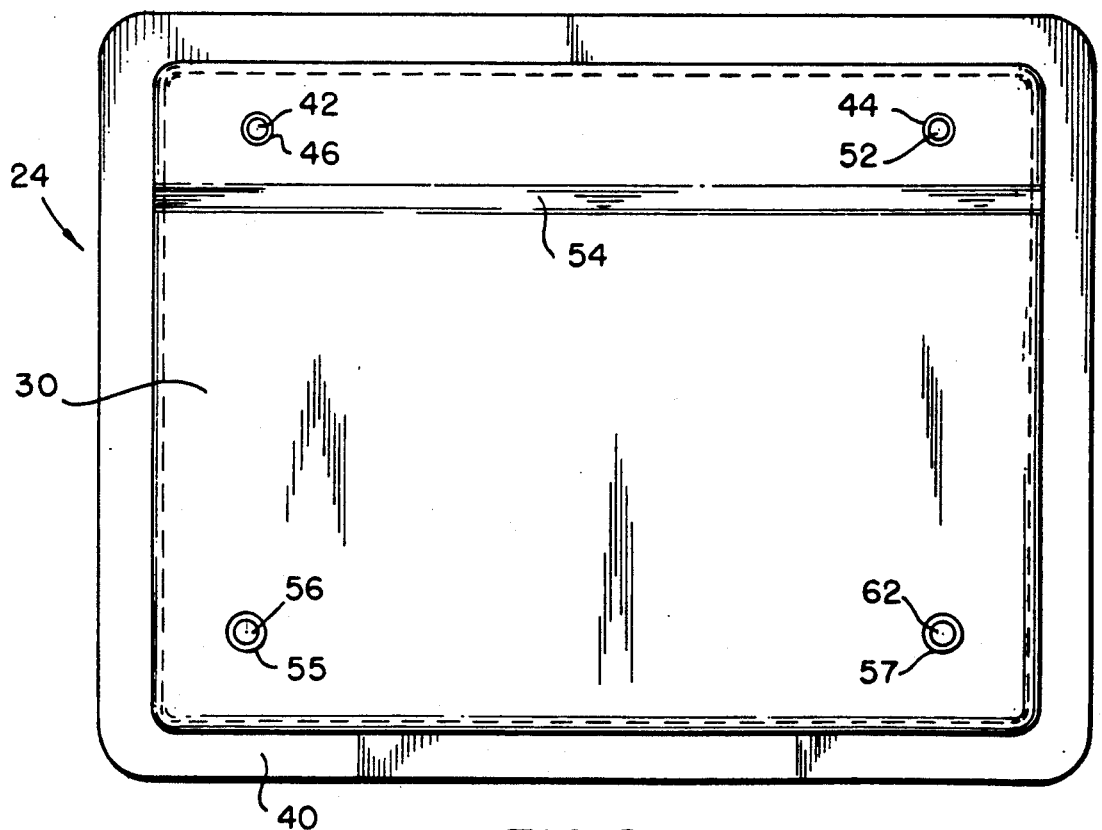
FIG. 2 is a bottom view of the air bag module of FIG. 1.

The module 24 is attached at the upper portion thereof to the armature 14 of the steering wheel 10 by two bolts or studs 42 and 44 each of which have a head at one end and is threaded at the other, and that extend outwardly in spaced apart relation from the housing plate 30. Stud 42, as shown in FIGS. 2 and 3, extends outwardly from aperture 46 in plate 30 and into and through aperture 48 in the armature 14 of steering wheel 10, and is held securely in place by a nut 50. Stud 44 similarly extends outwardly from aperture 52 in plate 30, extends into an aperture (not shown) in armature 14, and is held securely in place by a nut (not shown) that is similar to the nut 50.

For enabling the module 24 to be deflected slightly, when depressed, in order to blow the horn, the plate 30, as best seen in FIGS. 2 and 3, is provided with an embossment or offset portion 54 that extends for the full width of the module 24. If desired, however, the embossment 54 may comprise a circular or truncated embossment that surrounds each of the apertures 46 and 52 in the plate 30 through which the respectively associated studs 42 and 44 extend.

The plate portion 30 of housing member 29 includes a first pair of apertures 46 and 52 (which are sometimes referred to herein as upper apertures) and a second pair of apertures 55 and 57 (referred to herein as lower apertures).

Similarly, at the lower portion of plate portion 30, a first shoulder bolt and stud 56 extends outwardly from lower aperture 55 in the plate 30 and a second shoulder bolt and stud 62 extends outwardly from lower aperture 57. The term "bolt and stud", as used herein, is meant a pin or rod having a head at one end and threaded at the other end and which is pressed in place in the aperture from which it extends. The term "bolt or stud", on the other hand, refers to a pin or rod having a head at one end and which, if a "bolt" fits easily in the aperture from which it extends, but if a "stud", is pressed in place therein. As shown in FIG. 3, shoulder bolt and stud 56 extends through an aligned aperture in armature 14 and is retained by a lock nut 60 in a manner described hereinafter.

Figure 4:
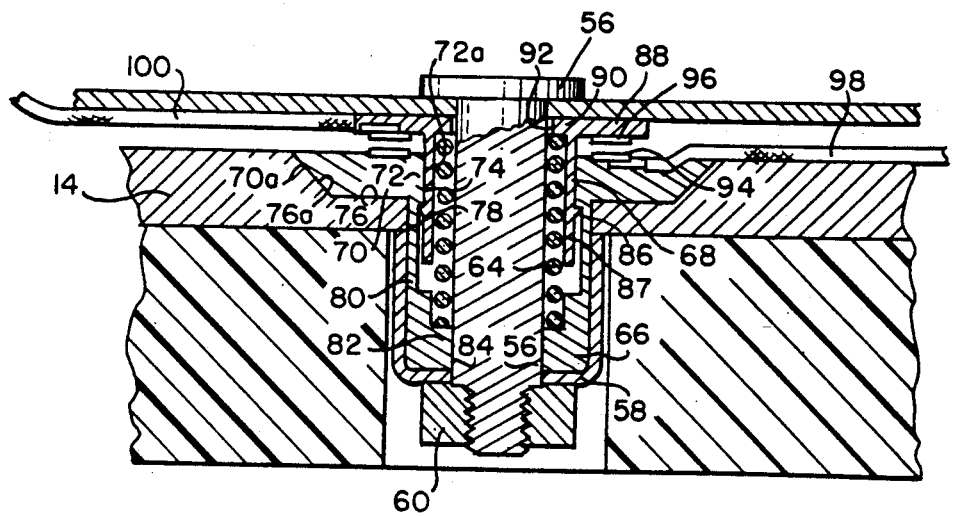
FIG. 4 is an enlarged view of the portion of FIG. 3 that is circumscribed by a circular dotted line.

The horn switch assembly 26, as seen in FIGS. 3 and 4, consists of shoulder bolt and stud 56 which in conjunction with a perforated cup shaped assembly retainer 58 and the lock nut 60 holds the assembly including the air bag module 24 to the steering wheel 10. The second shoulder bolt and stud 62 is provided in association with a second horn switch assembly (not shown) that is identical to the horn switch assembly 26. The two horn switch assemblies serve to hold the module 24 in a floating, that is, deflectable relationship to the steering wheel 10 for enabling horn blowing to be effected by pressing on the module 24.

As shown in FIGS. 3 and 4, the horn switch assembly 26 consists of a pre-stressed coil compression spring 64 and two concentric flanged cylindrical housings, specifically an outer housing 66 and an inner housing 68 that are arranged to snap together as described hereinafter. Outer housing 66 includes a relatively thick radially outwardly extending flange portion 70 with a flange portion 72 that extends radially inwardly for a relatively short distance, forming an aperture 72a in outer housing 66 through which a cylindrical portion 74 of inner housing 68 extends in a snug fit. Flange portion 70 includes a tapered edge portion 70a that is configured to match a tapered edge portion 76a of a cavity or depression 76 in the armature 14 of the steering wheel 10 such that the surface 70b of the flange 70, which surface 70b is flat, lies in the same plane as the flat surface in the armature 14 when the outer housing 66 is positioned in operative relationship with the latter. At the center of the cavity 76 in the armature 14 is an aperture 78 through which the cylindrical portion 80 of the outer housing 66 extends in a snug fit. The inner wall of the cylindrical portion 80 of the outer housing 66 is stepped upwardly whereby there is effected a substantial reduction in the thickness of the wall of cylindrical portion 80 for a region immediately below the flange 70, as best seen in FIG. 4. At the base 82 of the outer housing 66 there is provided an aperture 84 through which the stud 56 extends in a snug fit.

Inner housing 68 includes a circumferential ridge 86 that slopes upwardly and outwardly on the outer surface of a cylindrical wall 87 thereof, and in addition, a flange portion 88 that extends radially outwardly and a flange portion 90 that extends radially inwardly forming an aperture 92 in the inner housing 68 through which the stud 56 extends in a snug fit. When the inner housing 68 is inserted through aperture 72a in the outer housing 66, into concentric relation with the outer housing 66, flange portions 88 and 90 of the inner housing 68 are held spaced from the flange portions 70 and 72 of the outer housing 66 by compression spring 64 which is seated between the inner housing flange portion 90 and the base 82 of the outer housing 66. At a predetermined spacing between flange portions 70, 72 and 88, 90, the circumferential ridge 86 on the cylindrical surface of the inner housing 68 slides over the lower edge of the aperture 72a in the outer housing 66. This causes the two housings to snap together, capturing the inner housing 68 in concentric relation with the outer housing 66.

The housings 66 and 68, which are made of electrical insulating material such as a suitable plastic, houses electrical contacts 94 and 96 which are configured in the form of flat rings and are made of good electrically conductive material, with contact 94 being suitably adhered to the flange portion 70 of the outer housing 66 and the contact 94 being suitably adhered to the flange portion 88 of the inner housing 66. Suitably insulated electrical lead wires 98 and 100 provide a connection from contacts 94 and 96, respectively, to a suitable electrical power source and the horn mechanism within the vehicle.

The gap between the electrical contacts 94 and 96 is governed by the vibration requirements of the automotive vehicle in which the air bag module 24 and horn assembly 26 is installed and the stiffness of the compression spring 64.

Figure 5:
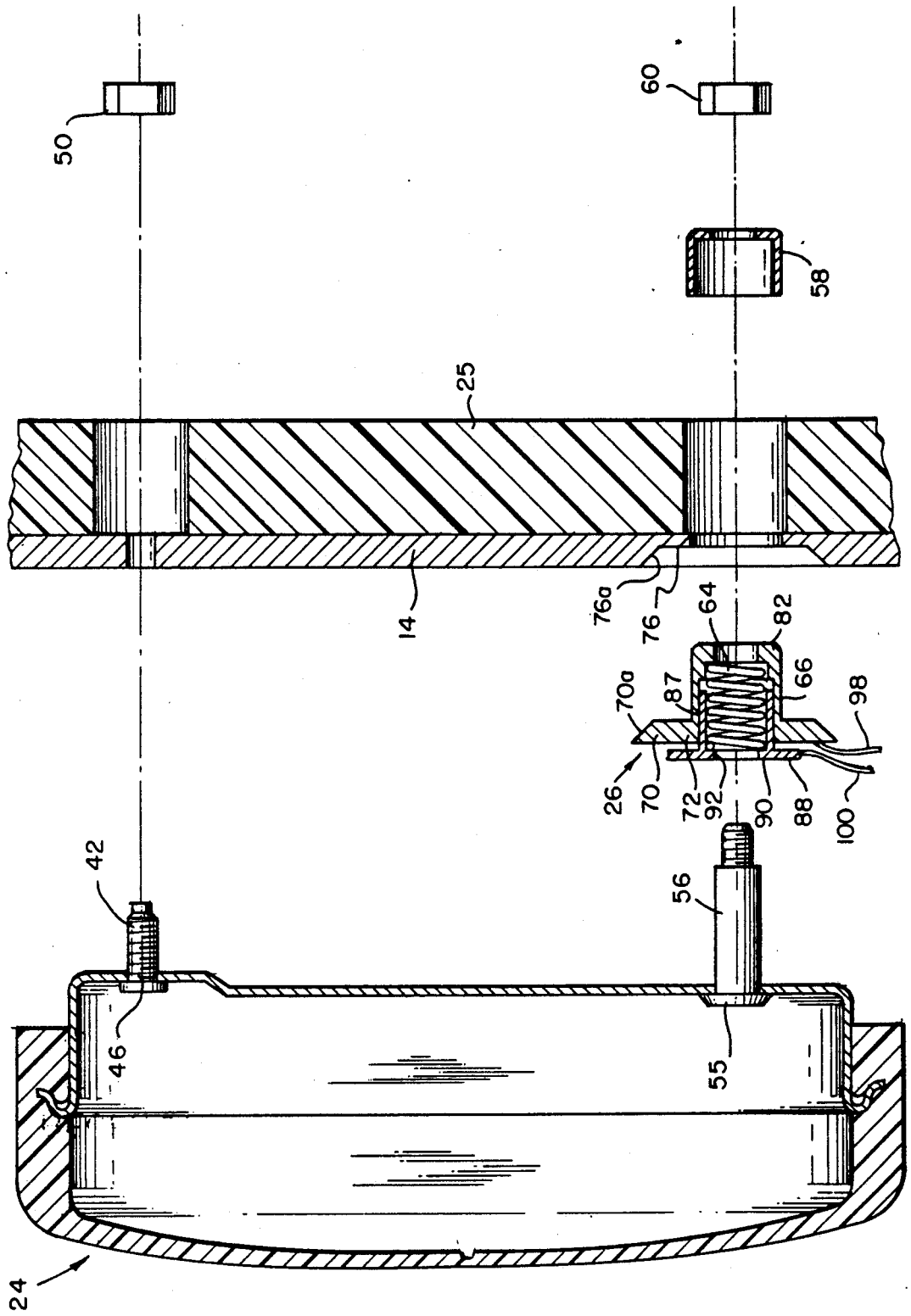
FIG. 5 is an exploded view illustrating how the horn blowing switch according to the invention is put together.

FIG. 5 is an exploded view that shows how the assembly of the air bag module 24 and the two horn blowing switch assemblies 26 are put together. With the air bag module 24 held fixed at the upper two studs 42 and 44, as illustrated, the gap 102 on the upper show surfaces of the module 24 can be held to tight tolerances. The gaps between the electrical contacts 94 and 96 at the lower two studs 56 and 62, that is, at the horn switch assemblies 26, can be held to a minimum to help in reducing the lower or bottom show surface gap 104.

It is contemplated that, if desired, a horn blowing switch assembly 26 may be provided at each of the four steering wheel attachment points or stud locations instead of only at the two attachment points at the lower portion of the module 24, as illustrated herein.

For blowing the horn on the vehicle, the driver is required only to press the air bag module 24 inwardly against the steering wheel 10 from a generally central portion thereof. This results in closure of the electrical contacts 94 and 96 of each of the horn switches 26 to complete an electrical circuit through the lead wires 98 and 100 to a source of power and the horn. With the module 24 fixedly attached at the upper attachment studs 42 and 44, there is no possibility of lateral movement thereof as it is pressed against the steering wheel 10. When a horn switch assembly 26 is provided at each of the four attachment points of the module 24, blowing of the horn may be effected by pressing inwardly on the module from any upper surface portion thereof, with no lateral movement of the module occurring.

In the event of a need to service the horn switches 26, the nuts 50 for retaining studs 42 and 44 and the lock nuts 60 for retaining shoulder bolt studs 56 and 62 can be removed by the use of a suitable wrench inserted through respectively associated openings 106 and 108 that are provided in the steering wheel shroud 25. By reference to FIG. 5, it will be seen that such removal of the nuts 50 and 60 permits the air bag module 24 to be removed intact, that is with no invasion thereof, from the steering wheel armature 14, with the studs 42, 44, 56 and 62 fixedly attached thereto, as shown. Such removal provides easy access to each of the horn switch assemblies 26 for servicing thereof. Upon the completion of such servicing and the reinsertion of the serviced horn switches 26 in the apertures 78 in the armature 14, the air bag module 24 is readily reassembled to the armature 14 by the insertion of the shoulder bolt studs 56 and 62 through the apertures 84 and 92 of the horn switches, and the insertion of the studs 42 and 44 through the respectively associated apertures in the armature 14.

Thus, in accordance with the invention, there has been provided a center blow horn switch assembly for use with an air bag module mounted on the steering wheel of an automotive vehicle that allows the horn switch assembly to be readily serviced without disassembling or replacing the module. The center blow horn switch assembly further is characterized in that it can be used at each of the steering wheel attachment studs, or the top portion of the module can be fixed with the existing attachment means that have been provided. An advantage obtained with the module held fixed at the upper two studs is that the gap on the upper show surface can be held to a tight tolerance. The electrical contact gap at the lower two studs can be held to a minimum to help in reducing the lower show surface gap.

With this description of the invention in detail, those skilled in the art will appreciate that modifications may be made to the invention without departing from the spirit thereof. Therefore, it is not intended that the scope of the invention be limited to the specific embodiments illustrated and described. Rather, it is intended that the scope of the invention be determined by the appended claims and their equivalents.

What is claimed is:

1. In combination with a steering wheel having an armature portion and a rim portion and an inflatable restraint module assembly including a housing member having a plate portion with first and second pairs of spaced apertures therein aligned with corresponding apertures in the armature portion of the steering wheel with an attachment stud fixedly attached to the housing plate portion individual to and extending through and from each of the apertures therein and through the corresponding apertures in the armature portion for holding the module assembly to the steering wheel, a separate horn blowing switch assembly individually associated with each of two at least of said attachment studs, each such horn blowing switch assembly being operative normally to hold a portion at least of the module assembly in predetermined spaced relation to the armature portion and comprising:

a pre-stressed compression spring, first and second cylindrical housings each of which have a flange disposed on one end thereof, which housings snap together with said stud and compression spring in concentric relation therewith and with the flanges thereof positioned in a predetermined spaced relation, said housings being movable relative to one another after being snap fitted to one another, a first electric contact positioned on the flange of said first cylindrical housing, a second electric contact positioned on the flange of said second cylindrical housing with said second electric contact disposed in contacting relation to said first electric contact, said first and second cylindrical housings being made of electrically non-conductive material and acting as an electrical insulator and housing said compression spring and electric contacts, with said compression spring holding said first and second housings in a predetermined positioned relationship with said electric contacts separated from each other by a predetermined gap, whereby pressing on said module causes relative movement between said first and said second cylindrical housings against the force of said compression spring causing said electric contacts to be brought into engagement with each other to close an electric circuit from a power source to a horn mechanism.

2. In combination, as defined by claim 1, wherein each of said two at least of said attachment studs is a shoulder bolt and stud, and wherein in each horn blowing switch assembly, said compression spring, said second cylindrical housing and said first cylindrical housing are disposed in concentric relation with the shoulder bolt and stud associated therewith radially outwardly thereof in the order recited.

3. In combination, as defined by claim 2, further including a perforated cup shaped assembly retainer and a lock nut for each horn blowing switch assembly, wherein each said assembly retainer is positioned in covering relationship with the lower portion of the associated said first cylindrical housing, and wherein each said lock nut is screwed on the adjacent end of the associated shoulder bolt and stud that extends through the associated said first cylindrical housing.

4. In combination, as defined by claim 3, wherein each said first cylindrical housing has a base member having an aperture through which said shoulder bolt and stud extends in a snug fit and wherein said flange of each said second cylindrical housing includes a portion that extends radially inwardly toward the associated said shoulder bolt and stud, and wherein the associated said compression spring is positioned between said base member of the associated said first cylindrical housing and the associated said radially inwardly extending flange portion of said second cylindrical housing.

5. In combination, as defined by claim 4, wherein said flange on each said first cylindrical housing includes a radially inwardly extending portion forming an aperture therein through which the cylindrical portion of the associated said second housing is movable in sliding relation, and wherein said cylindrical portion of each said second housing includes a circumferential sloping rib therein positioned intermediate the length thereof, which rib is arranged upon being moved completely through said aperture in said radially inwardly extending portion of the flange of the associated said first housing against the force of the associated said compression spring to move radially outwardly under the edge of said radially inwardly extending portion of the flange of the associated said first housing thereby to capture said second housing within the associated said first housing.

6. The combination comprising, a vehicle steering wheel having a rim portion and an armature portion provided with a plurality of apertures therein, and an inflatable restraint module located on the armature of the steering wheel and including a separate attachment stud having a threaded end and extending therefrom through each of said apertures in said armature and a nut screwed on each of the threaded ends of said studs to fixedly attach said inflatable restraint module to the steering wheel, and a horn blowing switch assembly associated with one at least of said attachment studs and operative normally to hold a portion at least of said inflatable occupant restraint module in a predetermined spaced relation to said armature, said horn blowing switch assembly comprising:

a pre-stressed compression spring, a first cylindrical housing having a flange at one end, a second cylindrical housing having a flange at one end, said flanges being positioned in predetermined spaced relation, said compression spring, said second cylindrical housing, and said first cylindrical housing being disposed in concentric relation with said one of said attachment studs radially outwardly thereof in the order recited in the individually associated aperture in said armature, a perforated cup shaped assembly retainer positioned in covering relation with said first housing on the threaded end of said one of said attachment studs and secured to said armature by said nut screwed on the threaded end of said one of said attachment studs, a first electric contact positioned on the flange of said first cylindrical housing, a second electric contact positioned on the flange of said second cylindrical housing, said first and second contacts being disposed in opposing relation to each other, said first cylindrical housing and said second cylindrical housing being made of electrically non-conductive material and acting as an electrical insulator and housing said compression spring and electric contacts, with said compression spring holding said first and second housings in a predetermined positioned relationship with said electric contacts separated from each other by a predetermined gap, whereby pressing on said module causes relative movement between said first and said second cylindrical housings against the force of said compression spring causes said electric contacts to be brought into engagement with each other to close an electric circuit from a power source to a horn mechanism.

7. A horn blowing assembly comprising:

first support means having an aperture therein, stud means having a head portion at one end and a threaded portion at the other end, said stud means being fixedly attached to said support means through the aperture thereof by said head portion thereof, second support means having an aperture therein in alignment with the aperture in said first support means, a pre-stressed compression spring, a first housing having a cylindrical portion with a base portion at one end and a flange at the other end that has a radially outwardly extending portion and a radially inwardly extending portion with respect to the cylindrical portion thereof, said first housing being inserted in said aperture of said second support means, a second housing having a cylindrical portion with a flange at one end that has a radially outwardly extending portion and a radially inwardly extending portion with respect to said cylindrical portion thereof, the diameter of the cylindrical portion of said second housing being less than that of the cylindrical portion of said first housing, said first and second housings being made of electrically non-conductive material and being arranged in concentric relation with each other such that the respective flanges thereof are normally disposed in predetermined spaced relation, a first electric contact positioned on the outwardly extending portion of the flange of said first housing, a second electric contact positioned on the outwardly extending portion of the flange of said second housing with said second electric contact disposed in contacting relation to said first electric contact, wherein said compression spring, said second housing and said first housing are disposed in concentric relation with said stud means radially outwardly thereof in the order recited, with said compression spring being positioned between said first housing and said radially inwardly positioned flange portion of said second housing and holding said first and second housings in a predetermined, positional relationship with said first electric contact and said second electric contact separated from each other by a predetermined gap, an assembly retainer positioned in covering relation with said first housing on the threaded end of said stud, and a lock nut screwed on the threaded end of said stud to secure said horn blowing assembly to said second support means, wherein relative movement of said first support means with respect to said second support means against the force of said compression spring causes said first electric contact and said second electric contact to be brought into engagement to close an electric circuit from a power source to a horn mechanism.

8. A horn blowing assembly, as defined by claim 7, wherein said cylindrical portion of said second housing includes a circumferential sloping rib thereon intermediate the length thereof, which rib upon being moved inwardly through the aperture in the radially inwardly extending portion of the flange of said first housing against the force of said compression spring moves radially inwardly under the edge of said radially inwardly portion of the flange of said first housing thereby to cause said first housing and said second housing to snap together.

9. A horn blowing assembly, as defined by claim 8, wherein said first support means includes an inflatable restraint module assembly having a housing plate portion with first and second pairs of spaced apertures therein, an aperture of one pair of said apertures being the said aperture in which said stud is fixedly attached, and wherein said second support means includes the armature of a vehicle steering wheel, said armature having first and second pairs of apertures therein that are aligned with the first and second pairs of apertures in said housing plate of said inflatable restraint module, one of said apertures in said armature being the aperture in which said first housing is inserted.

10. A horn blowing assembly as defined by claim 9 wherein said stud means comprises a shoulder bolt and stud having a head at one end and a threaded portion at the other end, and further included stud means attached to and extending through and from each of one of the pairs of spaced apertures in said module housing plate portion through aligned apertures in said armature, said further included stud means each having a head at one end and a threaded portion at the other end thereof, and nut means screwed on the threaded ends of each of said further included stud means to attach said inflatable restraint module to said armature.

* * * * *